United States Patent
Salter et al.

(10) Patent No.: US 11,117,453 B2
(45) Date of Patent: Sep. 14, 2021

(54) VEHICLE WINDOW EDGE WATER MANAGEMENT

(71) Applicant: FORD GLOBAL TECHNOLOGIES, LLC, Dearborn, MI (US)

(72) Inventors: Stuart C. Salter, White Lake, MI (US); Chester Stanislaus Walawender, Livonia, MI (US); Paul Kenneth Dellock, Northville, MI (US); Daniel J. Martin, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 208 days.

(21) Appl. No.: 16/528,792

(22) Filed: Aug. 1, 2019

(65) Prior Publication Data

US 2021/0031606 A1 Feb. 4, 2021

(51) Int. Cl.
*B60J 10/25* (2016.01)
*B60J 5/04* (2006.01)

(52) U.S. Cl.
CPC ............. *B60J 10/25* (2016.02); *B60J 5/0418* (2013.01)

(58) Field of Classification Search
CPC ................................. B60J 10/25; B60J 5/0418
USPC ......................................................... 296/154
See application file for complete search history.

(56) References Cited

U.S. PATENT DOCUMENTS

| | | | | |
|---|---|---|---|---|
| 2,029,978 A | * | 2/1936 | Andrews, Jr. .............. | B60J 1/14 296/154 |
| 2,108,322 A | * | 2/1938 | Thorp ....................... | B60J 1/14 296/96.11 |
| 2,119,635 A | * | 6/1938 | Griffith ...................... | B60J 1/14 296/154 |
| 2,390,260 A | * | 12/1945 | King .......................... | B60J 1/20 296/154 |
| 2,451,399 A | * | 10/1948 | Martin ....................... | B60J 1/14 296/154 |
| D157,991 S | * | 4/1950 | Mauck ........................ | D12/190 |
| 2,508,532 A | * | 5/1950 | Oliver ........................ | B60J 1/14 296/154 |
| 2,547,911 A | * | 4/1951 | Heyck ........................ | B60J 1/14 296/154 |
| 2,550,619 A | * | 4/1951 | Sutherland .............. | F24F 13/08 454/128 |

(Continued)

FOREIGN PATENT DOCUMENTS

| | | | | |
|---|---|---|---|---|
| DE | 898560 C | * | 11/1953 | ............. B60J 10/25 |
| DE | 102009003064 A1 | * | 11/2010 | ............. B60J 10/25 |

(Continued)

OTHER PUBLICATIONS

Neat® Coated Glass, Cardinal CG, Technical Service Bulletin, Bulletin #CG04-06/16, four pages, 2016.

*Primary Examiner* — Hilary L Gutman

(74) *Attorney, Agent, or Firm* — David Coppiellie; Carlson, Gaskey & Olds

(57) ABSTRACT

Vehicle windows may include water management features. In some embodiments, the vehicle windows include a water management corner piece for managing the flow of water or other precipitation around the window. The water management corner piece may be secured to a window glass pane and may positioned and shaped for channeling the water along an engineered drainage path.

20 Claims, 4 Drawing Sheets

(56) References Cited

U.S. PATENT DOCUMENTS

| | | | |
|---|---|---|---|
| 2,615,752 A * | 10/1952 | Hoag | B60J 1/20 296/154 |
| 2,770,486 A * | 11/1956 | Del Noce | B60J 1/14 296/154 |
| 5,009,464 A * | 4/1991 | Hasegawa | B62D 25/07 296/213 |
| 6,715,821 B2 * | 4/2004 | Kanie | B60J 1/10 296/146.15 |
| 7,324,261 B2 | 1/2008 | Tonar et al. | |
| 10,207,300 B2 | 2/2019 | Trevett et al. | |
| 2006/0107599 A1 | 5/2006 | Luten | |
| 2014/0306480 A1 * | 10/2014 | Sasaki | B60J 10/70 296/93 |

FOREIGN PATENT DOCUMENTS

| | | | |
|---|---|---|---|
| FR | 2888281 A1 * | 1/2007 | B60J 10/75 |
| FR | 2891492 A1 * | 4/2007 | B60J 1/17 |
| FR | 2956069 A1 * | 8/2011 | B60J 5/0418 |
| JP | 2004217152 A * | 8/2004 | |
| JP | 5733197 B2 | 6/2015 | |

\* cited by examiner

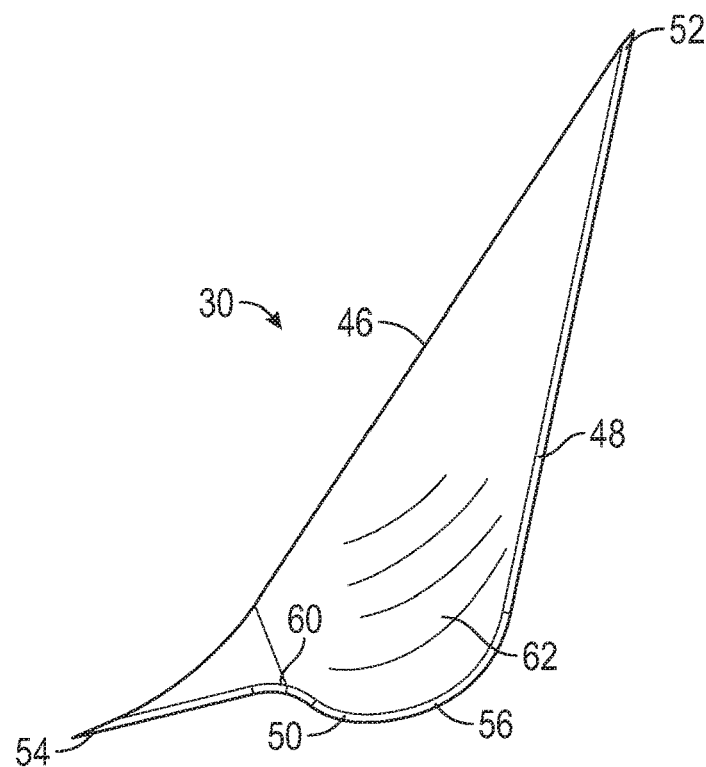
FIG. 5A
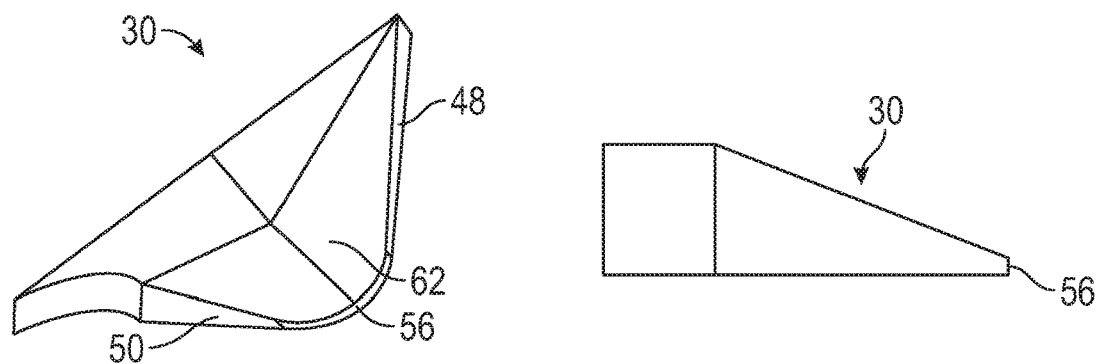
FIG. 5B
FIG. 5C
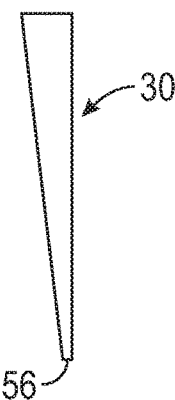
FIG. 5D

VEHICLE WINDOW EDGE WATER MANAGEMENT

TECHNICAL FIELD

This disclosure relates to vehicle windows, and more particularly to vehicle window water management corner pieces that are positioned and shaped for managing the flow of water around the windows.

BACKGROUND

During rainfall or other precipitation generating events, water can matriculate around vehicle windows and drip inside the vehicle doors. It would be desirable to redirect any water flow to minimize this condition.

SUMMARY

A vehicle window according to an exemplary aspect of the present disclosure includes, among other things, a glass pane and a corner piece attached to the glass pane and configured to direct water along an engineered drainage path.

In a further non-limiting embodiment of the foregoing vehicle window, the corner piece is made of a hydrophilic material.

In a further non-limiting embodiment of either of the foregoing vehicle windows, the corner piece is coated with a hydrophilic coating.

In a further non-limiting embodiment of any of the foregoing vehicle windows, the corner piece is attached to an angled lower rear edge of the glass pane.

In a further non-limiting embodiment of any of the foregoing vehicle windows, the corner piece includes a body that includes a front edge, a rear edge, and a bottom edge.

In a further non-limiting embodiment of any of the foregoing vehicle windows, the bottom edge is positioned at an inclined angle relative to a horizontal axis of a vehicle containing the vehicle window.

In a further non-limiting embodiment of any of the foregoing vehicle windows, the inclined angle of the bottom edge is between 10 degrees and 20 degrees.

In a further non-limiting embodiment of any of the foregoing vehicle windows, a curved surface connects between the rear edge and the bottom edge.

In a further non-limiting embodiment of any of the foregoing vehicle windows, an inward radius feature is formed in the bottom edge.

In a further non-limiting embodiment of any of the foregoing vehicle windows, an adhesive secures the corner piece to the glass pane.

A vehicle according to another exemplary aspect of the present disclosure includes, among other things, a door and a window movably mounted within the door. The window includes a glass pane and a corner piece mounted to the glass pane. The corner piece is a separate component from the glass pane.

In a further non-limiting embodiment of the foregoing vehicle, the corner piece is made of a hydrophilic material or is coated with a hydrophilic coating.

In a further non-limiting embodiment of either of the foregoing vehicles, the corner piece includes a body that includes a front edge, a rear edge, and a bottom edge. The front edge and the rear edge meet together at an upper corner of the corner piece, the front edge and the bottom edge meet together at a lower front corner of the corner piece, and the rear edge and the bottom edge meet together at a lower rear corner of the corner piece.

In a further non-limiting embodiment of any of the foregoing vehicles, the lower front corner of the corner piece is mounted to an angled lower rear edge of the glass pane.

In a further non-limiting embodiment of any of the foregoing vehicles, the bottom edge is positioned at an inclined angle relative to a horizontal axis of the vehicle when viewed in a direction extending from the lower rear corner toward the lower front corner of the corner piece.

In a further non-limiting embodiment of any of the foregoing vehicles, the inclined angle of the bottom edge is between 10 degrees and 20 degrees.

In a further non-limiting embodiment of any of the foregoing vehicles, a curved surface connects between the rear edge and the bottom edge.

In a further non-limiting embodiment of any of the foregoing vehicles, an adhesive is applied between the glass pane and the corner piece.

In a further non-limiting embodiment of any of the foregoing vehicles, the adhesive is a two-sided adhesive tape.

In a further non-limiting embodiment of any of the foregoing vehicles, the corner piece is mounted to the glass pane after securing the glass pane to the door.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 5A, 5B, 5C, and 5D illustrate an exemplary water management corner piece for a vehicle window.

DETAILED DESCRIPTION

This disclosure details vehicle windows that include water management features. In some embodiments, the vehicle windows include a water management corner piece for managing the flow of water or other precipitation around the window. The corner piece may be secured to a window glass pane and may positioned and shaped for channeling the water along an engineered drainage path. These and other features of this disclosure are described in greater detail below.

Figure 1:
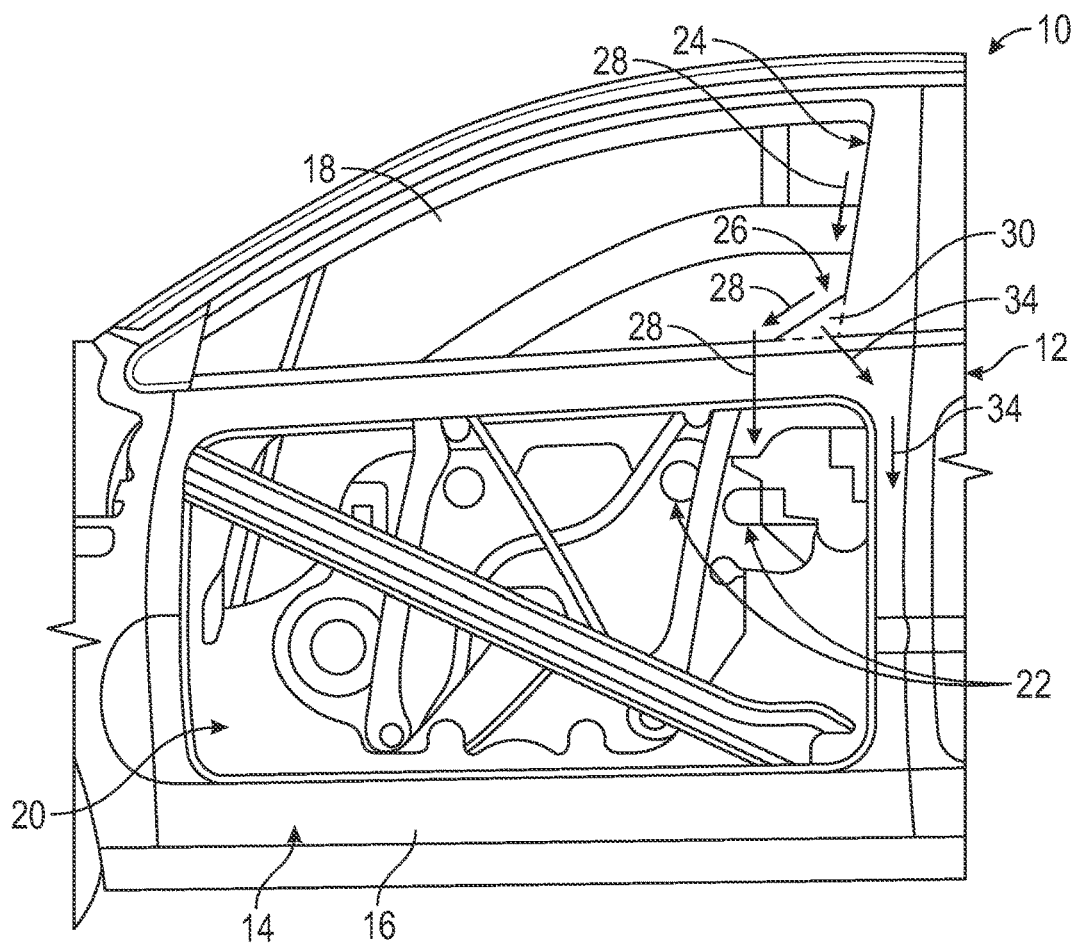
FIG. 1 illustrates a vehicle equipped with a door assembly that includes a door and a window.

FIG. 1 schematically illustrates select portions of a vehicle 10. The vehicle 10 could be a car, a truck, a van, a sport utility vehicle, or any other type of vehicle. In an embodiment, the vehicle 10 is a conventional, internal combustion engine powered vehicle. In another embodiment, the vehicle 10 is a high voltage traction battery powered electric vehicle (e.g., battery electric vehicle (BEV), hybrid electric vehicle (HEV), plug-in hybrid electric vehicle (PHEV), etc.). In yet another embodiment, the vehicle 10 is an autonomous vehicle in which the motive functions of the vehicle 10 are controlled without direct input from a human driver.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 includes a vehicle body 12 that supports a door assembly 14. The door assembly 14 may be utilized to enter and exit the vehicle 10. Although a single door assembly 14 is shown in FIG. 1, the vehicle 10 could include two or more door assemblies.

Each door assembly 14 of the vehicle 10 may include a door 16 and a window 18 movably mounted within the door 16. The window 18 of FIG. 1 is illustrated in a closed position relative to the door 16. The window 18 may be lowered into an open position relative to the door 16 in order to allow airflow to enter into the interior of the vehicle 10. In the open position, the window 18 may be at least partially received within an interior cavity 20 of the door 16. Various electronics 22, such as keyhole mechanisms, latching mechanisms, window actuating mechanisms, etc., may also be housed in the interior cavity 20. Portions of an exterior panel of the door 16 are removed in FIG. 1 to better illustrate the interior cavity 20.

During rainfall or other precipitation generating events (e.g., car washes, etc.), water can matriculate along a rear edge 24 of the window 18 until it reaches an angled lower rear edge 26 that faces toward a rear of the vehicle 10, at which point the water will typically drip off the window 18 and then down into the interior cavity 20 of the door 16. The drainage path of the water is schematically illustrated in FIG. 1 by arrows 28. Over time, the water that enters the interior cavity 20 can infiltrate the electronics 22 or render them temporarily inoperable (e.g., such as due to freezing during winter climate conditions). Water management corner pieces 30 (shown in phantom in FIG. 1) that are designed to provide an engineered flow path for guiding the flow of water around the vehicle windows are therefore proposed within this disclosure.

Figure 2:
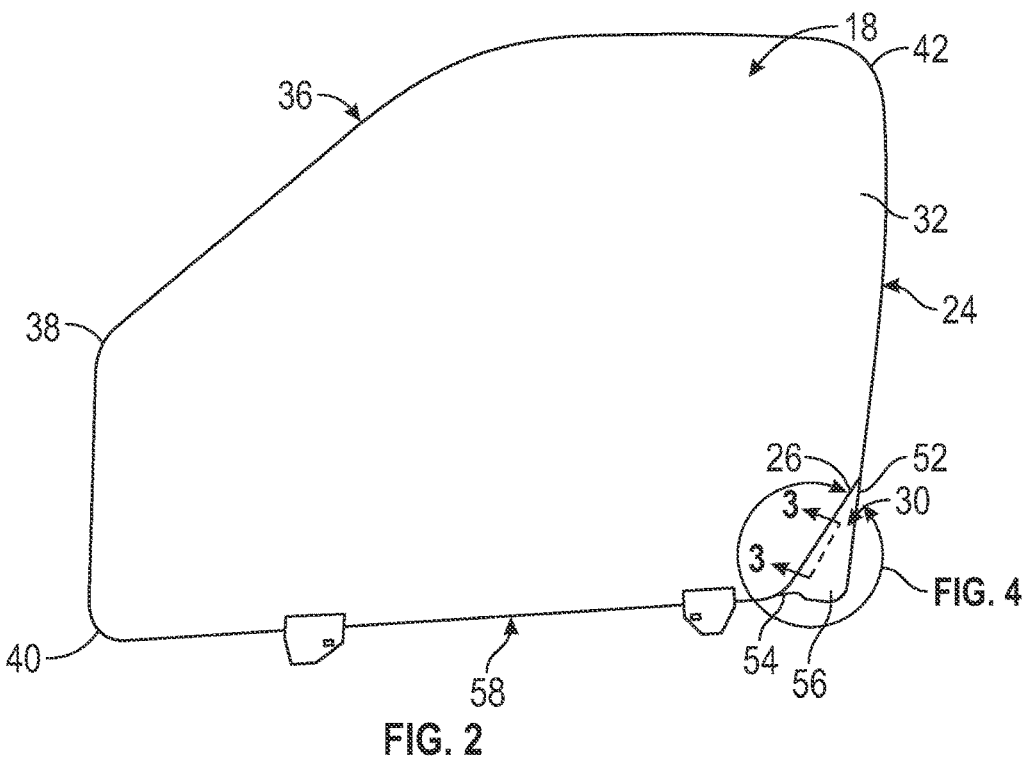
FIG. 2 illustrates a window of a door assembly.

FIG. 2 illustrates a window 18 of the vehicle 10 of FIG. 1. The window 18 includes a glass pane 32 and a corner piece 30 attached to the glass pane 32. As discussed in greater detail below, the corner piece 30 is designed to direct water along an engineered drainage path (shown schematically in FIG. 1 by arrows 34) that substantially limits the amount of water entering into the interior cavity 20 of the door 16, thereby increasing the functionality and lifespan of the electronics 22 that are housed inside the door 16.

The glass pane 32 may include any size and shape within the scope of this disclosure. In an embodiment, the glass pane 32 includes an outer perimeter 36 that establishes an upper front edge 38, a lower front edge 40, an upper rear edge 42, and an angled lower rear edge 26.

The corner piece 30 is a separate structure that is attachable to the glass pane 32 of the window 18. In an embodiment, the corner piece 30 is attached to the angled lower rear edge 26 of the glass pane 32. However, the corner piece 30 could be mounted at any location of the glass pane 32 where it is desirable to force water along an engineered drainage path.

Figure 3:
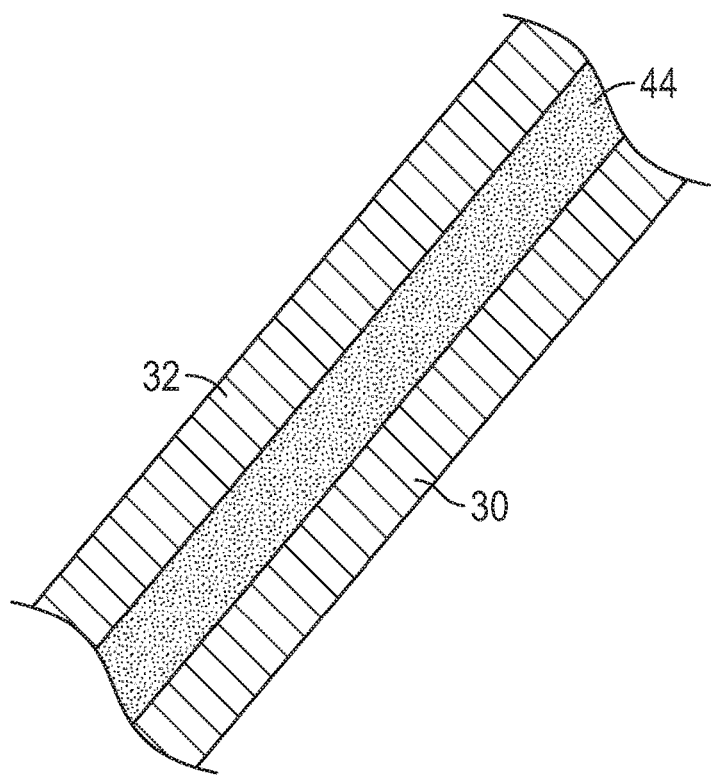
FIG. 3 is a cross-sectional view of a select portion of the window of FIG. 2.

The corner piece 30 may be secured to the glass pane 32 by an adhesive 44 (see FIG. 3). In an embodiment, the adhesive 44 is a two-sided adhesive tape. However, other adhesives could alternatively be used to mount the corner piece 30 to the glass pane 32.

In an embodiment, the corner piece 30 is made (e.g., molded or machined) from a hydrophilic material. Hydrophilic materials include surfaces in which the contact angle of a water droplet is 90 degrees or less and therefore the water tends to cling to the surface of the material. Providing the hydrophilic material will help ensure that the water is directed along the engineered drainage path once it comes into contact with the corner piece 30. In an embodiment, the hydrophilic material is an acrylic, such as Poly(methyl methacrylate) (PMMA). However, other hydrophilic materials are also contemplated within the scope of this disclosure.

In an embodiment, the contact angle of the surface of the hydrophilic material may be enhanced, or made more hydrophilic, by surface treating the corner piece 30. The corner piece 30 may be surface treated using an air plasma corona treatment, for example.

In another embodiment, the contact angle of the surface of the hydrophilic material of the corner piece 30 may be made more hydrophilic by coating the surface with a hydrophilic coating. An exemplary hydrophilic coating is the Aculon® AcuWet 470 hydrophilic coating, although other coatings may also be suitable.

Figure 4:
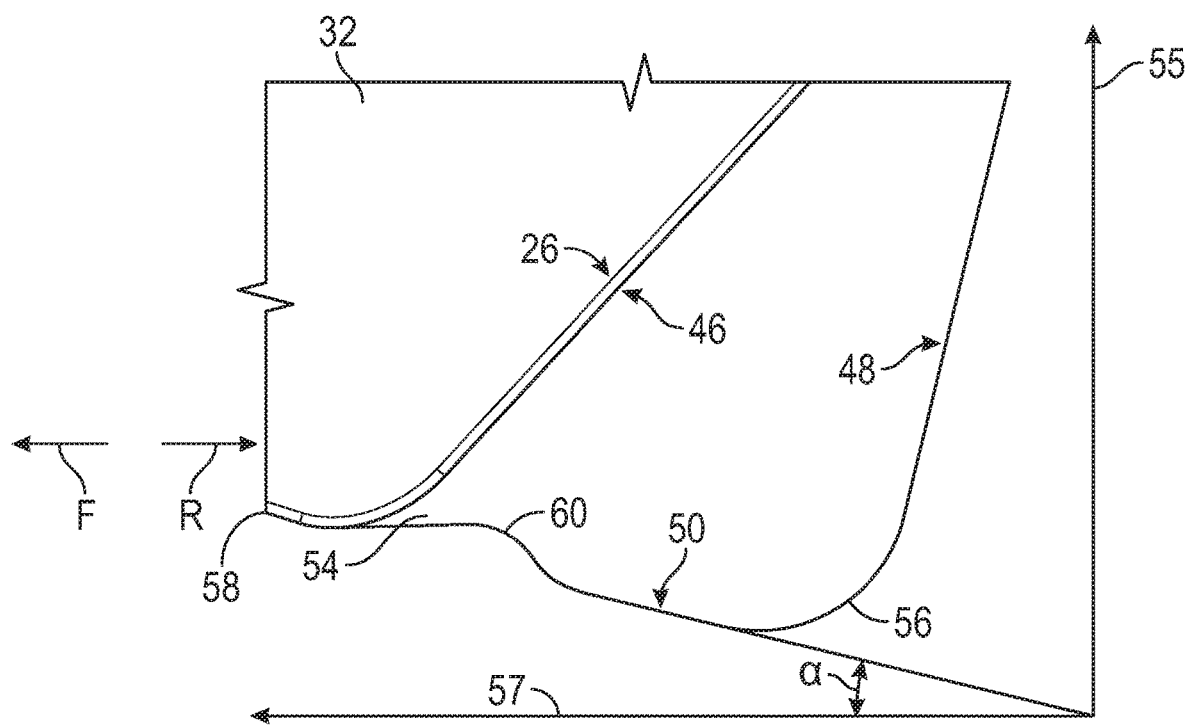
FIG. 4 is a blown up view of a select portion of the window of FIG. 2.

Referring now primarily to FIGS. 2 and 4, the corner piece 30 may include a body having a a front edge 46, a rear edge 48, and a bottom edge 50. When mounted, the front edge 46 faces toward a front section F of the vehicle 10 and the rear edge 48 faces toward a rear section R of the vehicle 10. In addition, in a mounted position of the corner piece 30, each of the front edge 46, the rear edge 48, and the bottom edge 50 extend at a transverse angle relative to both a Z-axis 55 (i.e., a vertical axis) and a an X-axis 57 (i.e., a horizontal axis) of the vehicle 10.

The front edge 46 and the rear edge 48 may meet together at an upper corner 52 of the corner piece 30. The front edge 46 and the bottom edge 50 may meet together at a lower front corner 54 of the corner piece 30. The rear edge 48 and the bottom edge 50 may meet together at a lower rear corner 56 of the corner piece 30.

Referring primarily to FIG. 4, the bottom edge 50 of the corner piece 30 may be angled at an inclined angle α relative to the X-axis 57 of the vehicle 10 and when viewed in a direction toward a lower edge 58 of the glass pane 32 (i.e., in a direction from the rear edge 48 toward the front edge 46 of the corner piece 30). In an embodiment, the inclined angle α is between about 10 degrees and about 20 degrees. The inclined angle α helps ensure that water is drained from the window 18 at the lower rear corner 56 of the corner piece 30 rather than matriculating back toward the lower edge 58 of the glass pane 32.

The bottom edge 50 of the corner piece 30 may additionally include an inward radius feature 60 (e.g., an indentation or bump formed into the bottom edge) that further exaggerates the inclined path of the bottom edge 50. The inward radius feature 60 helps ensure that no water will escape the engineered drainage path established by the corner piece 30. In an embodiment, the inward radius feature 60 is formed in the bottom edge 50 at a location that is between the lower front corner 54 and the lower rear corner 56 of the corner piece 30.

FIGS. 5A-5D illustrate additional features of the corner piece 30 of the window 18. The corner piece 30 may include a curved surface 62 (best illustrated in FIGS. 5A and 5B) that connects the rear edge 48 to the bottom edge 50. The actual radius of the curved surface 62 may vary and is design dependent. The combination of the inclined angle α of the bottom edge 50 and the curved surface 62 establishes a funnel-like shape at the lower rear corner 56, thereby helping to guide water to drain at the lower rear corner 56 of the corner piece 30.

Figure 6:
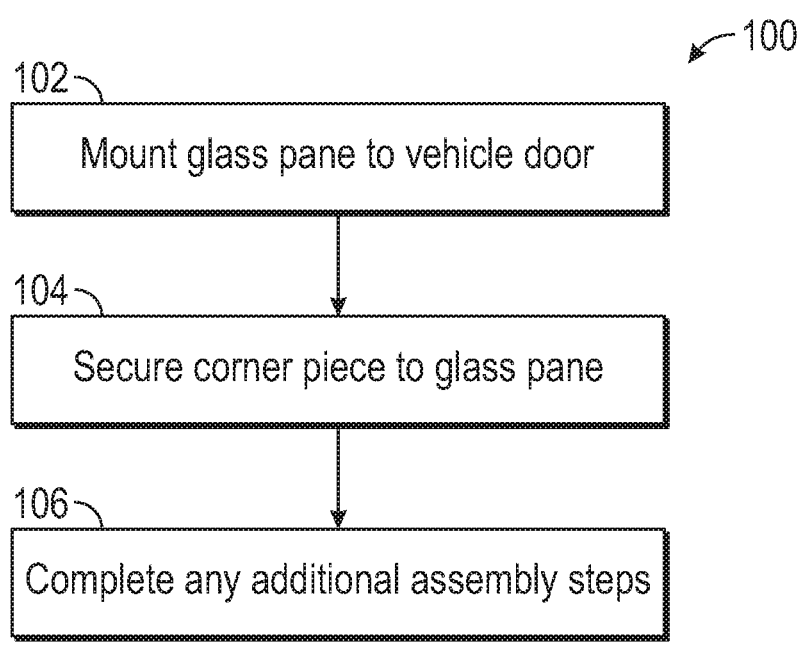
FIG. 6 schematically illustrates an exemplary vehicle assembly method.

FIG. 6, with continued reference to FIGS. 1-5D, schematically illustrates a vehicle assembly method 100. In an embodiment, the vehicle assembly method 100 can be employed for mounting the window 18 to the door 16 of the vehicle 10.

First, at block 102, the glass pane 32 is mounted to the door 16 of the vehicle 10. The glass pane 32 may be movably secured relative to the door in any manner Next, at block 104, the corner piece 30 is secured to the glass pane 32 using the adhesive 44. Additional assembly steps may be performed at block 106, such as additional assembly procedures along a vehicle assembly line, to complete the vehicle assembly method 100.

The corner piece 30 could also be utilized as an aftermarket part that may be attached to pre-existing car models where the glass pane is already mounted to the door. The corner piece may be designed to fit any window corner edge shape, thus making it useful for nearly any vehicle.

The window water management corner pieces of this disclosure are specifically positioned and shaped to force water to follow an engineered drainage path that is specifically created to direct water away from interior door electronics such as latching and keyhole mechanisms. The corner pieces thereby increase the functionality and lifespan of the electronics by ensuring that water does not enter the electronics and subsequently freeze. The ability to add the corner pieces onto windows after assembly allows current window designs to be used without modification.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle window, comprising:
a glass pane; and
a corner piece attached to the glass pane and configured to direct water along an engineered drainage path, wherein the corner piece is attached to an angled lower rear edge of the glass pane.

2. The vehicle window as recited in claim 1, wherein the corner piece is made of a hydrophilic material.

3. The vehicle window as recited in claim 2, wherein the hydrophilic material is an acrylic material.

4. The vehicle window as recited in claim 3, wherein the acrylic material is Poly(methyl methacrylate) (PMMA).

5. The vehicle window as recited in claim 1, wherein the corner piece includes a body that includes a front edge, a rear edge, and a bottom edge.

6. The vehicle window as recited in claim 5, comprising a curved surface connecting between the rear edge and the bottom edge.

7. The vehicle window as recited in claim 5, comprising an inward radius feature formed in the bottom edge.

8. The vehicle window as recited in claim 7, wherein the inward radius feature includes an indentation or bump formed into the bottom edge, and further wherein the indentation or the bump is adapted to establish an inclined path of the bottom edge.

9. The vehicle window as recited in claim 1, comprising an adhesive that secures the corner piece to the glass pane.

10. A vehicle window, comprising:
a glass pane; and
a corner piece attached to the glass pane and configured to direct water along an engineered drainage path,
wherein the corner piece includes a body that includes a front edge, a rear edge, and a bottom edge,
wherein the bottom edge is positioned at an inclined angle relative to a horizontal axis of a vehicle containing the vehicle window.

11. The vehicle window as recited in claim 10, wherein the inclined angle is between 10 degrees and 20 degrees.

12. A vehicle, comprising:
a door;
a window mounted within the door and being movable between a closed position and an open position,
wherein the window is at least partially received within an interior cavity of the door when in the open position; and
the window including a glass pane and a corner piece mounted to the glass pane,
wherein the corner piece is a separate component from the glass pane and is configured to direct water along an engineered drainage path that guides the water away from interior door electronics housed within the interior cavity.

13. The vehicle as recited in claim 12, wherein the corner piece is made of a hydrophilic material or is coated with a hydrophilic coating.

14. The vehicle as recited in claim 12, wherein the corner piece includes a body that includes a front edge, a rear edge, and a bottom edge, wherein the front edge and the rear edge meet together at an upper corner of the corner piece, the front edge and the bottom edge meet together at a lower front corner of the corner piece, and the rear edge and the bottom edge meet together at a lower rear corner of the corner piece.

15. The vehicle as recited in claim 14, wherein the lower front corner of the corner piece is mounted to an angled lower rear edge of the glass pane.

16. The vehicle as recited in claim 14, wherein the bottom edge is positioned at an inclined angle relative to a horizontal axis of the vehicle when viewed in a direction extending from the lower rear corner toward the lower front corner of the corner piece.

17. The vehicle as recited in claim 16, wherein the inclined angle is between 10 degrees and 20 degrees.

18. The vehicle as recited in claim 14, comprising a curved surface connecting between the rear edge and the bottom edge.

19. The vehicle as recited in claim 12, comprising an adhesive applied between the glass pane and the corner piece, wherein the adhesive is a two-sided adhesive tape.

20. The vehicle window as recited in claim 1, wherein the corner piece is coated with a hydrophilic coating.

* * * * *